US008181326B2

(12) United States Patent
Silliman et al.

(10) Patent No.: US 8,181,326 B2
(45) Date of Patent: May 22, 2012

(54) METHOD AND APPARATUS FOR INSTALLING A SEAL

(75) Inventors: George Rowan Silliman, Rensselaer, NY (US); Mark Steven Pape, Scotia, NY (US); Harvey Harmeet Kaura, Greer, SC (US); Richard John Bever, Delanson, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/044,990

(22) Filed: Mar. 10, 2011

(65) Prior Publication Data

US 2011/0219600 A1    Sep. 15, 2011

(51) Int. Cl.
*B23P 11/02* (2006.01)
*B23P 19/02* (2006.01)

(52) U.S. Cl. ......... 29/451; 29/235; 29/450; 29/243.518; 29/243.517; 29/281.1

(58) Field of Classification Search ...... 29/450, 29/451, 402.02, 235, 244, 243.5, 243.517, 29/243.518, 243.519, 253, 256, 267, 268, 29/280, 281.1, 282, 898.11; 277/345
See application file for complete search history.

(56) References Cited

U.S. PATENT DOCUMENTS

| | | | |
|---|---|---|---|
| 6,832,428 B2 * | 12/2004 | Miura et al. | 29/450 |
| 7,331,761 B2 | 2/2008 | Hansen et al. | |
| 7,987,600 B2 * | 8/2011 | Erill et al. | 29/898.07 |
| 2001/0037548 A1 * | 11/2001 | Martin et al. | 29/281.1 |
| 2008/0104821 A1 * | 5/2008 | Erill et al. | 29/450 |
| 2009/0022442 A1 | 1/2009 | Bech et al. | |
| 2011/0078884 A1 * | 4/2011 | Conrad | 29/235 |

* cited by examiner

*Primary Examiner* — Essama Omgba
(74) *Attorney, Agent, or Firm* — James W. Pemrick; Ernest G. Cusick; Frank A. Landgraff

(57) ABSTRACT

An apparatus and method are provided for installing a seal into a part. A main body of the apparatus has two wings, and a raised shoulder that extends along the main body and two wings. A bracket is attached to the main body, and has an internally threaded hole for engagement with a threaded knob. An installation member is attached to the main body, and includes an insertion wheel attached to a wheel carrier. The wheel carrier is configured to be slidably attached to the main body. The main body is mounted on a first portion of the part and the seal is at least partially installed in a second portion of the part, such that upon relative rotation between the first portion of the part and the second portion of the part the installation member installs the seal.

19 Claims, 4 Drawing Sheets

METHOD AND APPARATUS FOR INSTALLING A SEAL

BACKGROUND OF THE INVENTION

The present invention described herein relates generally to a method and apparatus for installing a seal. More specifically, the present invention relates to a method and device for replacing a seal in the bearing of a wind turbine.

A pitch blade drive in a wind turbine acts on the blades of a wind turbine for changing their respective angles to achieve desired power or performance. For this reason, blades are pivotally guided around a longitudinal axis by bearings. Accordingly, the pitch blade drive requires the provision of a seal to prevent lubricant from leaking out and to prevent dust, water, and other contaminants from entering the pitch blade bearing. The wind turbine pitch blade bearing is usually provided with an outer seal and an inner seal.

Wind turbine bearings are generally designed for the life of the wind turbine. Seals that retain grease inside the bearing and protect it from different weather and contamination conditions, however, are not designed for such a lifetime. Therefore, such seals should be replaced with new ones periodically due to wear, dust, etc. Exact seal lifetime is not easily determined as it depends mainly on weather and contamination conditions, but as a reference, seals may be replaced about every three years.

Removal of an old seal from the wind turbine pitch bearing in situ or during pitch bearing manufacturing is currently very easy and quick as a seal is only needed to be pulled out from a bearing groove or seat. However, assembling a new seal into a wind turbine pitch bearing mechanism in situ (for example, when it is necessary for a seal to be replaced) or during pitch bearing manufacturing is currently a very difficult and slow operation. Such an in situ operation on a wind turbine usually involves an operator working at a height of over eighty meters from the ground, this being a hazardous and physically taxing working condition, and taking into account that operations may have to be performed external to the hub or within the confined spaces inside the hub.

One known method for facilitating the operator insertion of the seal into the bearing groove or seat of a wind turbine pitch bearing uses manually operated tools (e.g., hammers, pry bars, screwdrivers, etc.), and may also require the pitch motor(s) to be removed. However, they are time consuming and capital intensive because of high technical labor costs involved. Time required for the assembling of a new seal using manually operated tools involves undesirably long downtimes in which no electricity is produced by the wind turbine.

BRIEF DESCRIPTION OF THE INVENTION

In an aspect of the present invention, an apparatus is provided for installing a seal into a part. A main body of the apparatus has two wings, and a raised shoulder that extends along the main body and two wings. A bracket is attached to the main body, and has an internally threaded hole for engagement with a threaded knob. An installation member is attached to the main body, and includes an insertion wheel attached to a wheel carrier. The wheel carrier is configured to be slidably attached to the main body. The main body is mounted on a first portion of the part and the seal is at least partially installed in a second portion of the part, such that upon relative rotation between the first portion of the part and the second portion of the part the installation member installs the seal.

In another aspect of the present invention, a method is provided for installing a seal into a part. The method includes the steps of attaching a seal installation apparatus onto a first portion of the part. The seal installation apparatus includes a main body having two wings. Additional steps include installing a portion of the seal into a second portion of the part, and applying pressure to an insertion wheel in the seal installation apparatus to force a portion of the seal into the second part. A subsequent step includes rotating either the first portion of the part or the second portion of the part so that upon relative rotation between the first portion of the part and the second portion of the part the seal installation member installs the seal.

DETAILED DESCRIPTION OF THE INVENTION

Figure 1:
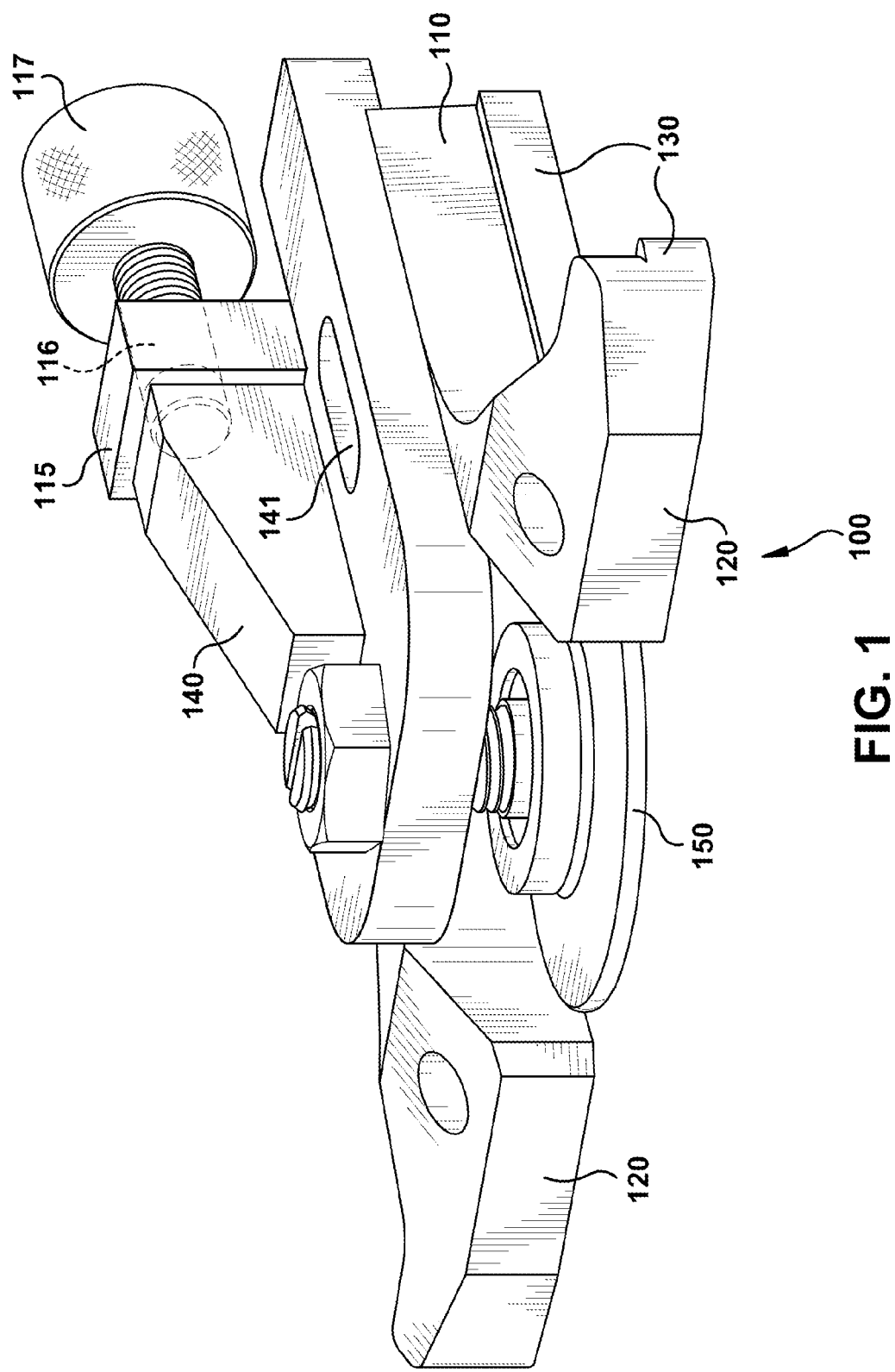
FIG. 1 is a perspective illustration of an apparatus used for installing a seal into a part in a wind turbine, according to an aspect of the present invention.

FIG. 1 is a perspective illustration of an apparatus 100 used for installing a seal into a part in a wind turbine. In one application, the apparatus 100 can be used to install the inner seal of the pitch bearing. The apparatus 100 includes a main body 110 having two wings 120. The main body 110 and wings 120 also include a raised shoulder 130 that extends along a lower portion thereof. A bracket 115 can either be formed integrally with the main body 110 or attached thereto and includes a threaded hole 116. A threaded knob 117 is threaded through hole 116 and is used to apply force to wheel carrier 140. Wheel carrier 140 rests in and may be constrained to linear motion by a groove (not shown) formed in the main body 110.

The installation member or wheel carrier 140 is slidably mounted on main body 110. Two slots 141 may be provided in the wheel carrier and a shoulder fastener (or other suitable guide) can be passed through each of the slots 141 and secured in a threaded hole (not shown) in main body 110. The wheel carrier supports insertion wheel 150, and the insertion wheel can be attached to wheel carrier 140 via a bearing, shaft and fastening arrangement. In one application the insertion wheel can be made of steel, titanium or any other suitable material.

Figure 2:
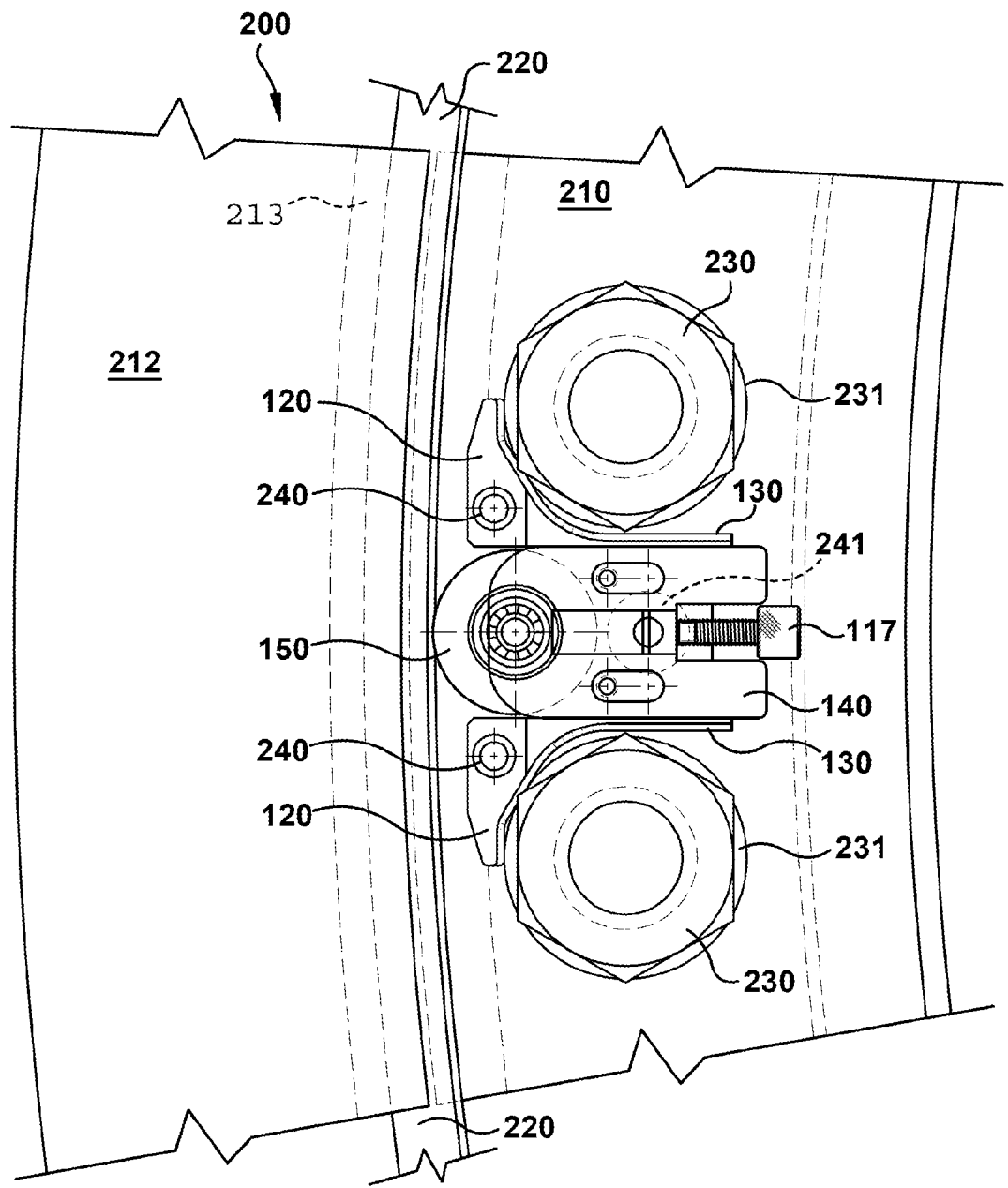
FIG. 2 is a top plan illustration of an apparatus used for installing a seal into a part in a wind turbine, according to an aspect of the present invention.

FIG. 2 illustrates a top view of the apparatus 100 set in place on a bearing of a wind turbine. The bearing 200 includes an inner (or first) ring 210 and an outer (or second) ring 212, and a plurality of rolling elements (not shown) are usually located between the two rings. The terms of inner/first and outer/second are used only for clarity to distinguish different elements of the bearing, and it is to be understood that the apparatus 100 could be installed on either the inner/first or outer/second ring as long as the seal was to be installed on the opposing ring. The inner ring 210 could also be referred to as a first portion of the bearing 200 and the outer ring 212 could be referred to a second portion of the bearing 200.

In this example, the bearing 200 is a pitch bearing located between a blade (not shown) of the wind turbine and a hub (not shown). The pitch bearing includes one or more seals that are used to seal in lubricant (e.g., grease) and to seal out undesirable elements (e.g., dirt, dust, moisture, etc.). In this example, an inner seal 220 is being installed within a groove 213 in outer ring 212.

To begin the seal installation process, a portion of the seal 220 can be inserted at least partially into groove 213. The apparatus 100 may then be placed between two fasteners 230 having washers 231. As one example, the fasteners 230 may be bolts or nuts on threaded shafts. In addition, the apparatus may be placed between the two fasteners before the seal is partially inserted. These fasteners are already present on the bearing 200, so no additional contact points or holes need to be provided. In some known approaches, additional holes needed to be formed in various parts of the wind turbine (e.g., in the blades), and these extra holes could weaken the blade. The present invention provides the advantage of not requiring extra holes in other parts of the wind turbine, and the result is a more reliable and simpler installation apparatus and wind turbine.

The apparatus 100 includes one or more magnets 240 located on each wing 120, and the magnets are preferably located near the bottom surface of the apparatus. One or more magnets 241 may also be located in the main body 110 as well. The magnets 240, 241 may be made of conventional ferro-magnetic or ferri-magnetic material, ceramic, or rare earth materials (e.g., samarium-cobalt, neodymium, neodymium-iron-boron, etc.). The magnets 240, 241 are attracted to the material of the inner ring 210 and help to retain the apparatus 100 in position. The magnets can be very advantageous when the apparatus 100 needs to be installed on a vertical or inverted surface, as magnets will hold the apparatus onto the ring 210 and eliminate the need for additional tooling to install the seal.

The shoulders 130 may be placed adjacent to and/or in contact with the washers 231. The shoulders 130 provide an offset or clearance that allows the points or corners of the fastener 230 to be avoided, as this may be desirable in some applications. The shoulders 130 and/or wings 120 will bear against the washer 231 and fastener 230 respectively when force is applied to the seal 220 via insertion wheel 150.

Figure 3:
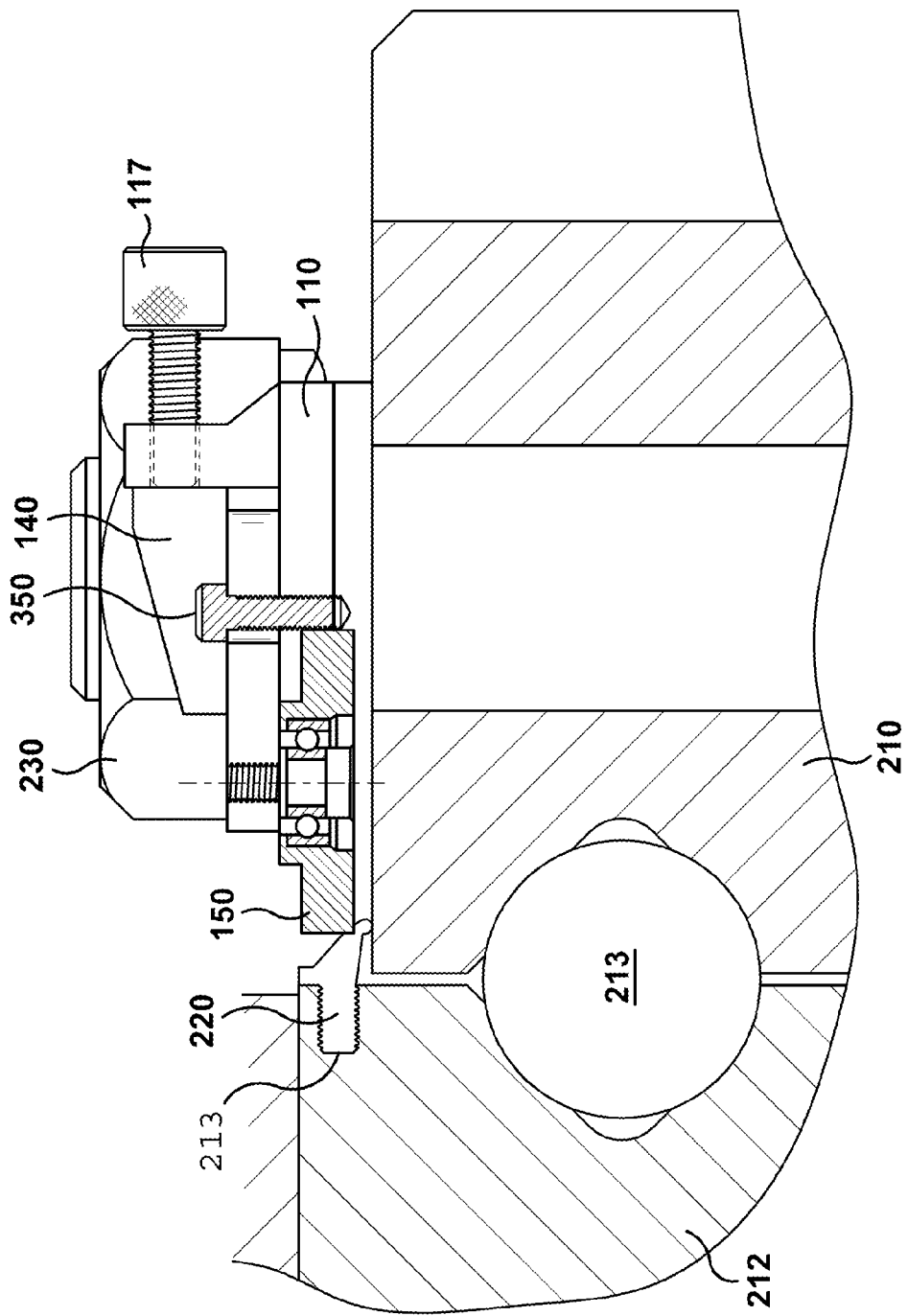
FIG. 3 is a partial cross-sectional illustration of an apparatus used for installing a seal into a part in a wind turbine, according to an aspect of the present invention.

FIG. 3 illustrates a partial cross-sectional view of the apparatus 100 mounted on a pitch bearing comprised of inner ring 210, outer ring 212 and a plurality of rolling elements 213. The seal 220 is shown inserted within groove 213. As one example only, the relative rotation of outer ring 212 with respect to inner ring 210 causes the insertion wheel 150 to roll along seal 220 and push seal 220 into groove 213. The apparatus 100 is prevented from moving away from the seal 220 during this process because the fasteners 230 act as a solid base. A shoulder fastener 350 (or other suitable guide or fastener) is passed through each of the slots 141 and secured in a threaded hole in main body 110 to keep the wheel carrier 140 attached to main body 110. It is to be understood that the outer ring 212 could be stationary while the inner ring 210 rotates, or vice versa, or both inner and outer ring could counter rotate.

Figure 4:
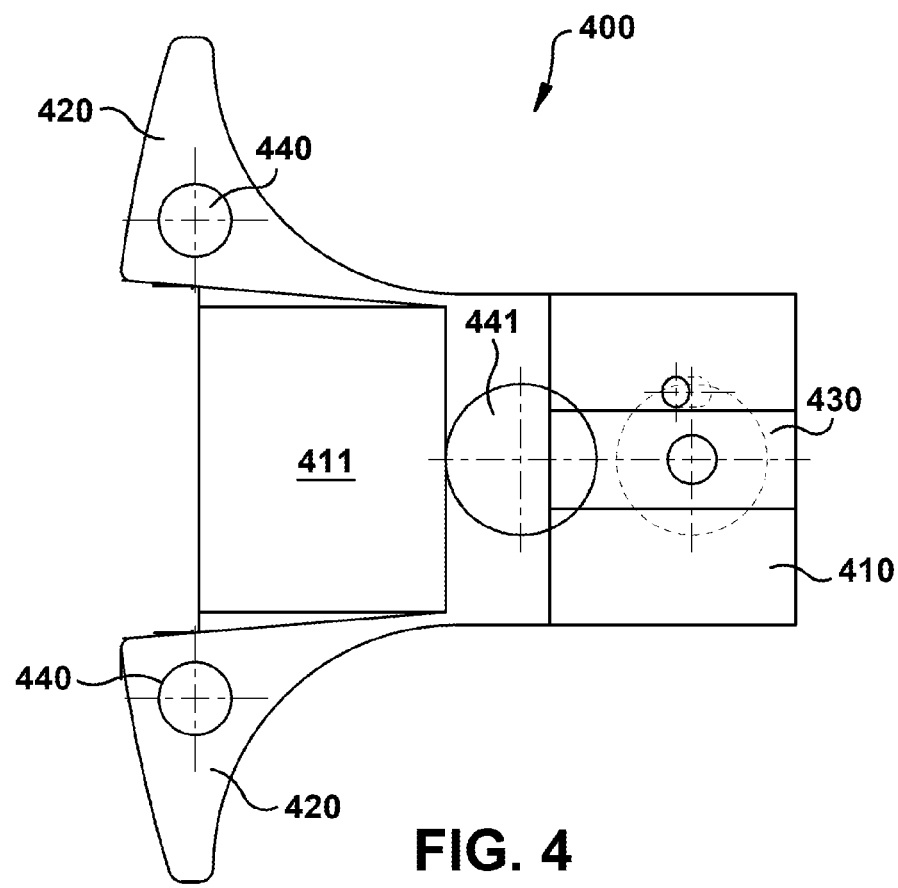
FIG. 4 is a top plan illustration of a brush holding apparatus used to clean a groove prior to installing seal for a part in a wind turbine, according to an aspect of the present invention.

FIG. 4 illustrates a top view of a brush holding apparatus 400 that is used to clean out the groove 213 prior to installation of seal 220. The brush holding apparatus 400 can include a main body 410 having two wings 420. A groove or through hole 430 can be provided in the main body for holding the handle of a brush. The main body may also include a ramped surface 411 that guides the brush into groove 213. One or more magnets 440 may be installed in or on the bottom portion of wings 420, and one or more magnets 441 may be installed in or on the bottom portion of main body 410. The magnets 440, 441 may be made of conventional ferro-magnetic or ferri-magnetic material, ceramic, or rare earth materials (e.g., samarium-cobalt, neodymium, neodymium-iron-boron, etc.). The magnets 440, 441 are attracted to the material of the inner ring 210 and help to retain the apparatus 400 in position. The magnets can be very advantageous when the apparatus 400 needs to be installed on a vertical or inverted surface, as magnets will hold the apparatus onto the ring 210. Although not shown in FIG. 4, the brush holding apparatus 400 may also include a shoulder similar to shoulder 130, as shown in FIGS. 1 and 2.

Figure 5:
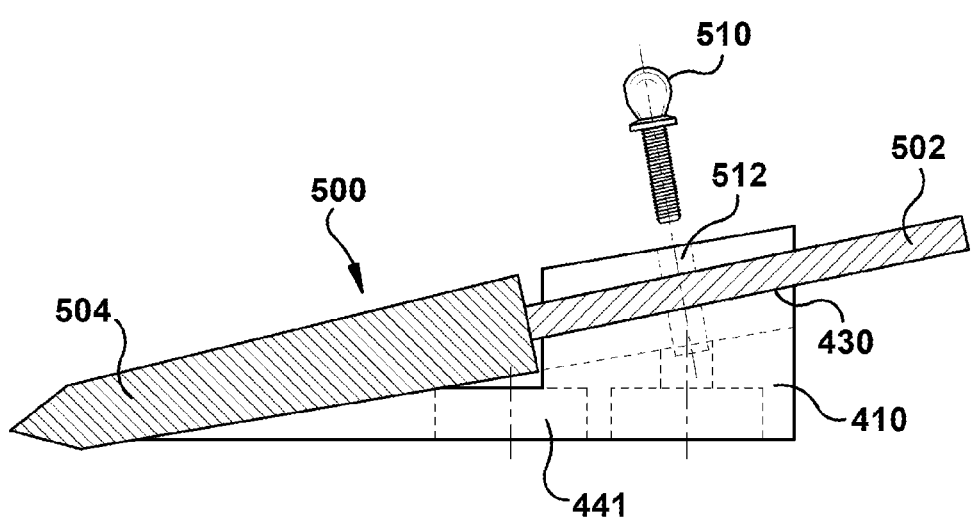
FIG. 5 is a cross-sectional illustration of a brush holding apparatus used to clean a groove prior to installing seal for a part in a wind turbine, according to an aspect of the present invention.

FIG. 5 illustrates a partial, cross-sectional view of brush holding apparatus 400 with a brush 500 mounted thereon. The brush 500 may be any readily available and easily purchased item and can include a wood or plastic handle 502 and a bristle or foam head 504. A thumb screw 510 can be used to retain the brush handle 502 within through hole 430, and this thumb screw 510 can be inserted into threaded opening 512 until it makes secure contact with the brush handle 502.

In use, the brush can be used to clean out the groove 213 prior to seal installation. A cleaning agent may be applied to brush head 504 and then relative motion can be initiated between the inner and outer bearing rings. This process can be repeated as often as desired with brushes containing cleaning agent or with dry brushes, as desired in the specific application.

A method of installing a seal into a part of a wind turbine includes the steps of attaching a seal installation apparatus onto a first portion of the part, where the seal installation apparatus includes a main body with two wings. The attaching step may include attaching the part to a first bearing ring of a bearing in a wind turbine. Another step installs a portion of the seal into a second portion of the part, and can be followed by a step of applying pressure to an insertion wheel in the seal installation apparatus to force a portion of the seal into the second part. The installing step may also include installing a portion of the seal into a groove in a second bearing ring of the bearing, wherein the first bearing ring and the second bearing ring are substantially coaxially disposed. Additionally, the applying pressure step may include rotating a threaded knob so that it bears against a wheel carrier attached to the insertion wheel, where the threaded knob used to apply a desired amount of force on the seal via the insertion wheel.

A subsequent step includes rotating either the first portion of the part or the second portion of the part so that upon relative rotation between the first portion of the part and the second portion of the part the seal installation member installs the seal. In addition to the steps above, an additional step may also include providing one or more magnets in the seal installation apparatus, and/or providing the main body and each of the two wings with at least one magnet, where the one or more magnets are used to attach to the bearing. In all the steps above, the bearing may be a pitch bearing for a blade in the wind turbine, and the seal may be an inner seal of the pitch bearing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus for installing a seal into a part comprising:
   a main body having two wings, a raised shoulder extending along the main body and the two wings;
   a bracket attached to the main body, the bracket having an internally threaded hole for engagement with a threaded knob;
   an installation member attached to the main body, the installation member including an insertion wheel attached to a wheel carrier, the wheel carrier configured to be slidably attached to the main body;
   wherein the main body is mounted on a first portion of the part and the seal is at least partially installed in a second portion of the part, such that upon relative rotation between the first portion of the part and the second portion of the part the installation member installs the seal.

2. The apparatus of claim 1, wherein the part is a bearing in a wind turbine and the first portion of the part and the second portion of the part comprise inner and outer rings of the bearing.

3. The apparatus of claim 2, wherein the bearing is a pitch bearing for a blade in the wind turbine.

4. The apparatus of claim 3, wherein the seal is an inner seal of the pitch bearing.

5. The apparatus of claim 2, wherein the main body includes one or more magnets that are used to attach to the bearing.

6. The apparatus of claim 5, wherein each of the two wings includes at least one magnet and the main body includes at least one magnet.

7. The apparatus of claim 1, wherein the threaded knob bears against a portion of the wheel carrier, the threaded knob used to apply a desired amount of force on the seal via the insertion wheel.

8. The apparatus of claim 1, wherein the wheel carrier is attached to the main body by the use of two shoulder fasteners, each of the two shoulder fasteners passing through a slot in the wheel carrier and into a threaded hole in the main body.

9. The apparatus of claim 1, wherein the insertion wheel is made of steel.

10. The apparatus of claim 1, further comprising a brush holding apparatus, the brush holding apparatus comprising:
    a brush holding main body having two brush holding wings, the brush holding main body having an internally threaded hole for engagement with a threaded screw, the brush holding main body adapted to hold a brush used to clean a groove in the second portion of the part;
    wherein the brush holding apparatus is mounted on a first portion of the part and the brush is used to clean the groove in the second portion of the part, such that upon relative rotation between the first portion of the part and the second portion of the part the brush cleans the groove.

11. A method of installing a seal into a part comprising:
    attaching a seal installation apparatus onto a first portion of the part, the seal installation apparatus including a main body having two wings;
    installing a portion of the seal into a second portion of the part;
    applying pressure to an insertion wheel in the seal installation apparatus to force a portion of the seal into the second portion;
    rotating either the first portion of the part or the second portion of the part so that upon relative rotation between the first portion of the part and the second portion of the part the seal installation apparatus installs the seal; and
    wherein the applying pressure step includes rotating a threaded knob so that it bears against a wheel carrier attached to the insertion wheel, the threaded knob used to apply a desired amount of force on the seal via the insertion wheel.

12. The method of claim 11, wherein the attaching step includes attaching the part to a first bearing ring of a bearing in a wind turbine.

13. The method of claim 12, wherein the installing step includes installing a portion of the seal into a groove in a second bearing ring of the bearing, wherein the first bearing ring and the second bearing ring are substantially coaxially disposed.

14. The method of claim 13, wherein the bearing is a pitch bearing for a blade in the wind turbine.

15. The method of claim 14, wherein the seal is an inner seal of the pitch bearing.

16. The method of claim 12, further comprising the step of:
    providing one or more magnets in the seal installation apparatus, the one or more magnets used to attach to the bearing.

17. The method of claim 16, wherein the providing step further comprises:
    providing the main body and each of the two wings with at least one magnet.

18. The method of claim 11, wherein the wheel carrier is attached to the main body by the use of two shoulder fasteners, each of the two shoulder fasteners passing through a slot in the wheel carrier and into a threaded hole in the main body.

19. The method of claim 11, further comprising forming the insertion wheel of steel.

* * * * *